United States Patent [19]

Holbrook

[11] 4,333,626
[45] Jun. 8, 1982

[54] AQUARIUM HEATER

[75] Inventor: Arthur J. Holbrook, Lynnfield, Mass.

[73] Assignee: Rolf C. Hagen (USA) Corp., Mansfield, Mass.

[21] Appl. No.: 90,674

[22] Filed: Nov. 2, 1979

Related U.S. Application Data

[62] Division of Ser. No. 949,436, Oct. 10, 1978, Pat. No. 4,313,048.

[51] Int. Cl.³ .............................................. A47G 29/00
[52] U.S. Cl. ................................... 248/360; 248/311.2
[58] Field of Search ................ 248/309 R, 311.2, 359, 248/360, 214, 215; 219/526, 311

[56] References Cited

U.S. PATENT DOCUMENTS

| | | | |
|---|---|---|---|
| 1,898,835 | 2/1933 | Henderson | 248/311.2 |
| 2,487,645 | 11/1949 | Gershon | 248/214 UX |
| 2,576,688 | 11/1951 | Landgraf | 219/526 X |
| 2,736,791 | 2/1956 | Krah et al. | 219/526 X |
| 3,007,177 | 11/1961 | Jackson et al. | 248/311.2 X |
| 3,301,518 | 1/1967 | Yetter et al. | 248/311.2 |
| 3,477,679 | 11/1969 | Lovitz | 248/311.2 X |
| 3,557,344 | 1/1971 | Decrosta | 219/311 |
| 3,842,241 | 10/1974 | Isaacson | 219/526 X |
| 3,842,981 | 10/1974 | Lambert | 248/311.2 X |

Primary Examiner—J. Franklin Foss
Attorney, Agent, or Firm—Wolf, Greenfield & Sacks

[57] ABSTRACT

An aquarium heater that is disposed on an outside surface of the aquarium tank for maintaining the water in the tank at a selectable temperature. The heater is preferably supported by a hanger or holder from a top edge of the tank and has a heat transfer plate disposed in intimate contact with a side or back wall of the tank. The heater includes, in addition to the heat transfer plate, a plastic or phenolic housing, a heating element, insulation and a settable thermostat contained in a temperature-sensing section of the housing. When the tank water is below a threshold temperature the thermostat closes coupling power to the heating element, which is preferably a rope-type resistance heater covered by a metal foil blanket, and when the temperature of the water reaches the threshold the thermostat temporarily opens to uncouple power to the heating element. In addition to the temperature sensing section of the housing there is also provided a heating section in which the heating element resides. The thermostat in the temperature sensing section is isolated from the heating section. Furthermore, the thermostat is in direct heat exchange relationship to the portion of the heat transfer plate overlying the heat sensing section of the housing.

8 Claims, 7 Drawing Figures

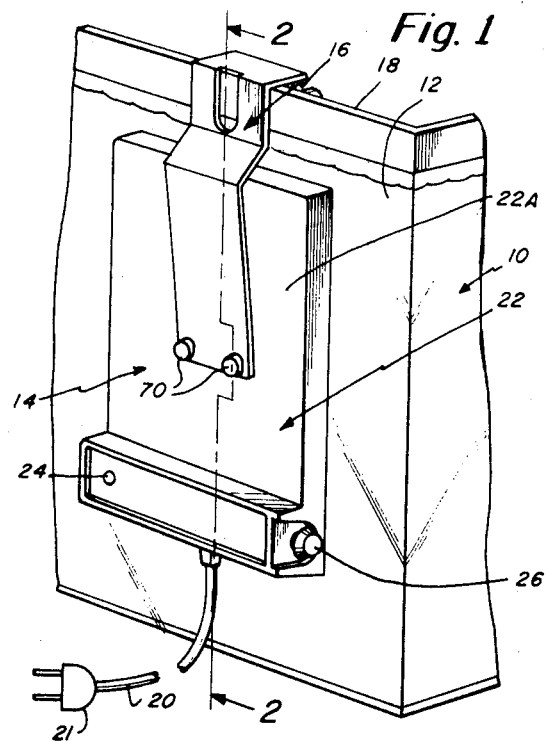
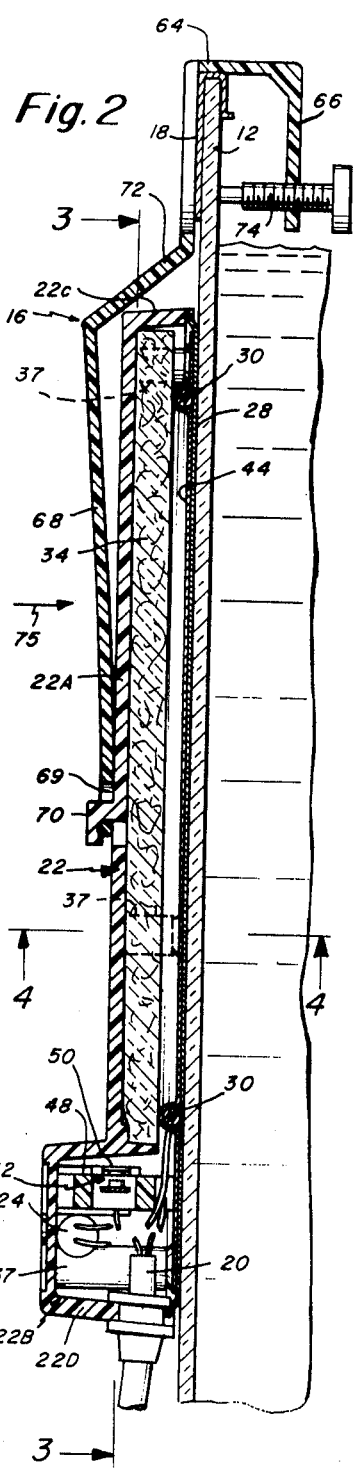
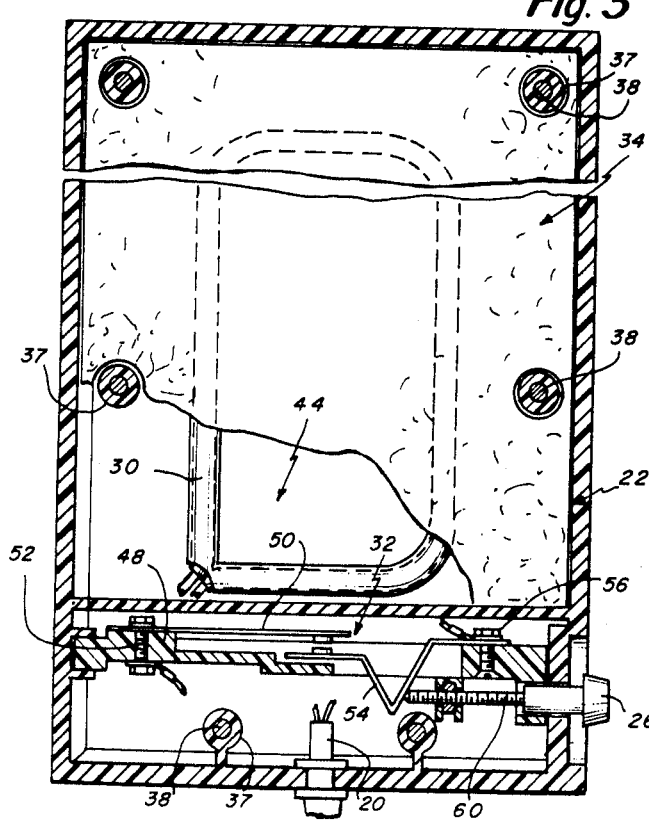

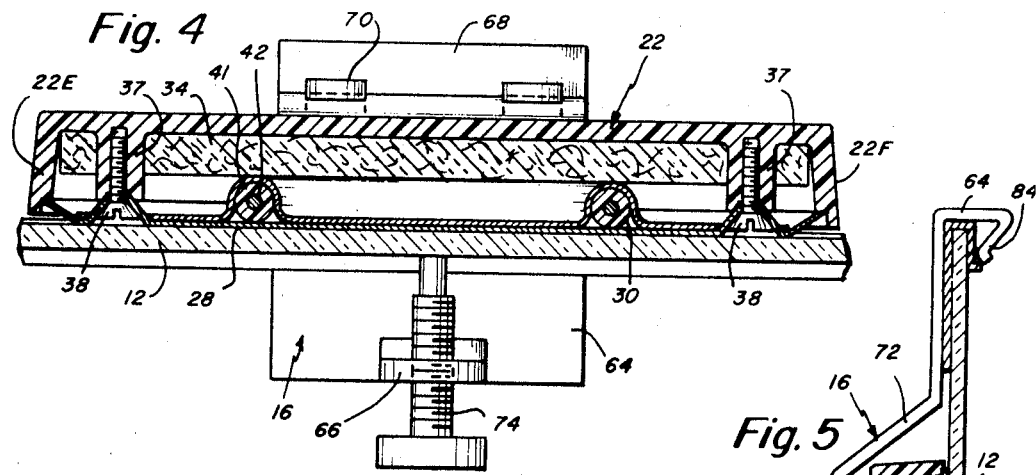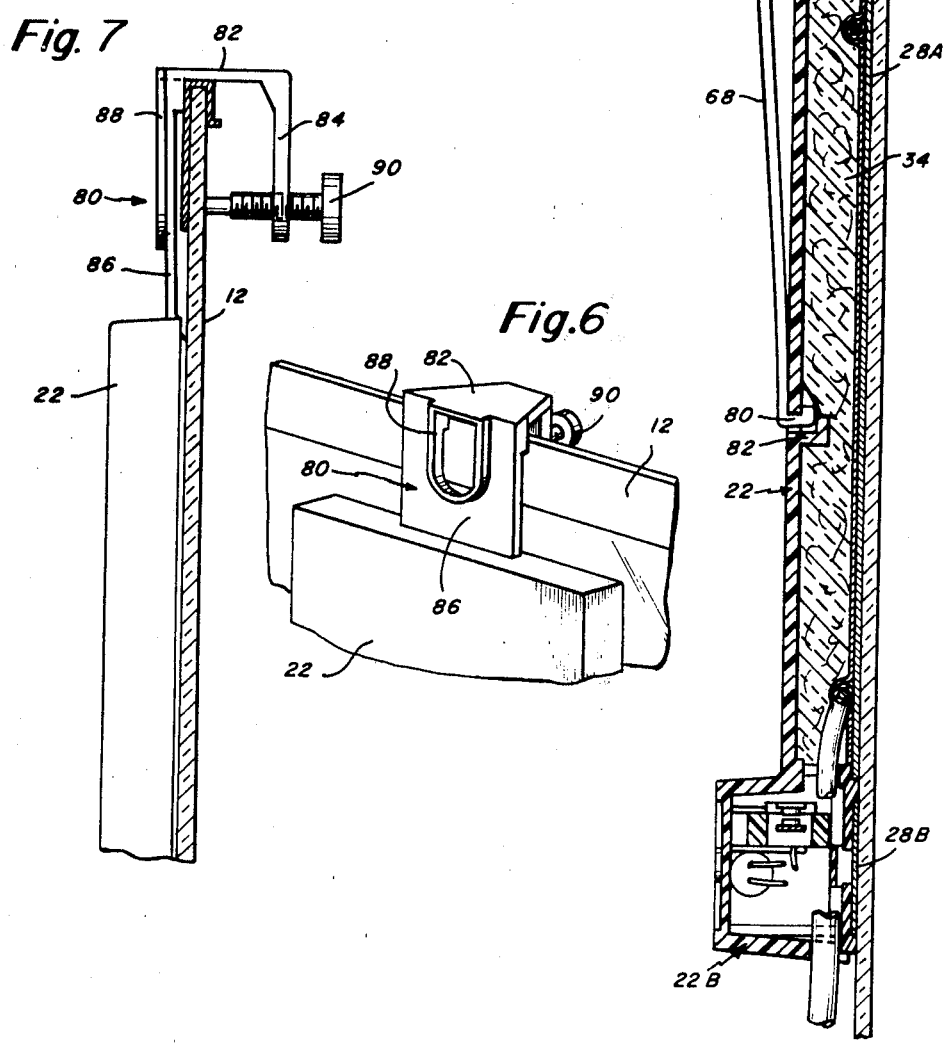

AQUARIUM HEATER

This is a division of application Ser. No. 949,436, filed Oct. 10, 1978 now U.S. Pat. No. 4,313,048.

BACKGROUND OF THE INVENTION

The present invention relates in general to a heater for use with an aquarium tank and, more particularly, to an aquarium tank heater that is disposed outside of the aquarium tank and secured to an outer surface thereof.

U.S. Pat. No. 3,842,241 shows one version of a prior art aquarium heater of the type that is mounted externally of the aquarium tank. However, this prior art device is not totally self-contained and requires the use of a separate temperature controller and temperature sensor. Furthermore, the sensor must be placed in the water within the tank and requires a connection between the sensor and the main heater unit.

Accordingly, it is an object of the present invention to provide an improved aquarium heater and of the type that is disposed outside of the aquarium tank.

Another object of the present invention is to provide an aquarium tank heater that is provided with relatively simple means for securing the heater in preferably intimate contact with an outer surface of the aquarium tank.

A further object of the present invention is to provide an aquarium heater that is of relatively simple construction and that is quite compact and readily adapted in shape for compatibility with an aquarium tank.

Still another object of the present invention is to provide an aquarium heater that is provided with a relatively large heating surface area, which area is preferably defined by a metallic plate held in relatively intimate contact with the side wall, usually of glass, of the aquarium tank.

Another object of the present invention is to provide an aquarium heater that is readily adapted to being secured in any one of a number of different positions on the aquarium tank.

Still another object of the present invention is to provide an aquarium heater that is relatively compact and that is essentially self-contained providing the functions of heating, temperature sensing, and settable temperature control all within one single self-contained unit.

SUMMARY OF THE INVENTION

To accomplish the foregoing and other objects of this invention, there is provided an aquarium heater for mounting on an outer surface of an aquarium tank. The aquarium heater is preferably mounted by means of a hanger from a top edge of the tank. The heater of this invention comprises a plastic housing having at least one open side and having means defining a heating section of the housing and a sensing section of the housing. The heating section of the housing is an upper section preferably and the sensing section is a smaller but wider section of the housing. A heat transfer plate means covers the open side of the housing and means are provided such as screws or the like for mounting the heat transfer plate means to the housing. A heating element is disposed in the heating section of the housing and means are provided for mounting the heating element to the inner surface of the heat transfer plate means. The heating element preferably comprises a resistance rope heater enclosed in a metal foil with both the heater and foil secured to the inner surface of the heat transfer plate means. The heating element covers preferably an area at least an order of magnitude less than the area of the heat transfer plate means. However, the heating element is sufficient to provide a relatively uniform heat gradient over the surface of the heat transfer plate. The heater includes means for receiving power which is coupled into the housing. The heater also includes a heat sensing thermostat means disposed in the sensing section of the housing for controlling power to the heating element. The heat sensing thermostat means preferably includes a bimetallic thermostat mounted in a bottom heat sensing compartment and including control knob means for controlling the thermostat. The control knob preferably extends from the housing and is manually operable to select different threshold of heat.

As previously mentioned, the heater is preferably supported by means of a hanger adjacent to a top edge of the aquarium tank. This hanger preferably has a top flange for contacting a top edge of the tank and a lower depending leg on the outside of the tank engageable with an outer surface of the heater for biasing the heater toward the tank side wall. In this way, the hanger biases the heater so that the heat transfer plate thereof is in relatively intimate contact with the outer surface of the side wall of the aquarium tank. In one embodiment of the present invention the hanger is provided as a separate piece from the rest of the heater. However, in the preferred embodiment of the invention the hanger is integral with the housing of the heater.

The prior art patent mentioned hereinbefore sensed water temperature by means of a separate thermistor or the like. However, in accordance with the present invention the water within the aquarium tank is essentially sensed indirectly by sensing the temperature within a sensing compartment in the housing. When the heater is first activated, the thermostat closes, activating the heating element. The metal transfer plate warms and the heat from the plate is conducted through the glass wall of the aquarium tank and is rapidly absorbed by the water in the tank. When the water in the tank is sufficiently warm, it influences the heat within the sensing chamber in the aquarium heater so as to open the thermostat switch thus shutting off the heater. From then on, the thermostat operates on an on and off sequence maintaining the water in the tank at or about a predetermined temperature. Once the aquarium water has reached the desired temperature, during successive "on" cycles of the heater, the metal heat transfer plate is usually only slightly warmed to maintain this temperature.

DESCRIPTION OF THE DRAWINGS

Numerous other objects, features and advantages of the invention will now become apparent upon a reading of the following detailed description taken in conjunction with the accompanying drawings, in which:

FIG. 1 is a perspective view of the aquarium heater of the present invention shown attached to the side wall of an aquarium tank;

FIG. 2 is a cross-sectional view through one embodiment of the heater of this invention as taken along line 2—2 of FIG. 1;

FIG. 3 is a further cross-sectional view partially cut away and taken along line 3—3 of FIG. 2;

FIG. 4 is a further cross-sectional view through the heater shown in FIGS. 1-3 as taken along line 4—4 of FIG. 2;

FIG. 5 is a longitudinal cross-sectional view similar to the one shown in FIG. 2 for an alternate embodiment of the invention also employing an alternate holder or hanger construction;

FIG. 6 is a fragmentary perspective view of an alternate preferred embodiment of the present invention wherein the hanger is integral with the housing of the heater; and FIG. 7 is a cross-sectional view similar to the view of FIG. 2 for this alternate hanger construction.

DETAILED DESCRIPTION

Referring now to the drawings and in particular to the perspective fragmentary view of FIG. 1, there is shown an aquarium tank 10 having a side wall 12. The tank is filled with water and the heater 14 of this invention is shown secured to the side wall 12 by means of a hanger 16 which secures the heater from a top edge 18 of the aquarium tank 10. FIGS. 2-4 show further details of the aquarium heater and associated hanger in a preferred embodiment. FIG. 5 shows an alternate construction.

FIG. 1 shows the heater 14 secured by means of the hanger 16 and having an electrical cord 20 coupling from the heater to a plug 21 which may be plugged into a conventional AC outlet. This connection couples 110 VAC power to the heater. FIG. 1 shows primarily the outer plastic housing 22 forming a portion of the heater. FIG. 1 also shows an indicator light 24 for indicating operation of the heater, and a control knob 26 for setting the desired temperature at which the water within the tank is to be maintained.

Referring now to FIGS. 2-4, in addition to the plastic housing 22, the heater 14 also comprises a heat transfer plate 28, a heating element 30, a bimetallic thermostat 32 shown in FIG. 3, and a sheet 34 of insulation material. The plastic housing 22 has an upper heating section defined primarily by elongated upright wall 22A, and a sensing section defined primarily by compartment 22B at the bottom of the housing. The section 22B, as depicted in FIG. 2 is wider so as to provide a sufficiently wide sensing compartment and so as to also be capable of accommodating the thermostat means of the invention. The housing 22 is substantially entirely open along its rear section so as to accommodate the heat transfer plate 28 which extends from a top wall 22C of the housing to a bottom wall 22D of the housing. For the purpose of support of the plate 28, the housing is provided with a plurality of plastic posts 37 integrally formed with the housing as depicted in FIG. 4 and for accommodating each a screw or bolt 38 for securing the heat transfer plate 28 to the housing. As noted in FIG. 4, the housing is also provided with elongated side walls 22E and 22F. The heat transfer plate, of course, also engages at two of its elongated sides with these side walls of the housing.

The heating element 30 is preferably a rope-type heater such as one made by Hot Watt Corporation of Danvers, Mass. This heating element comprises an outer casing 41 surrounding a resistance heater wire or the like 42. FIG. 3 shows the general path of the rope heater along a generally rectangular path. The heating element is in direct contact with the heat transfer plate 28 along one side of the heating element while the other side of the element is covered by a thin metal foil blanket 44. This blanket 44 preferably covers substantially the entire inner surface of the heat transfer plate 28. An appropriate adhesive may be used for securing the thin metal foil over the rope heater and inner surface of the plate 28. In an alternate embodiment of the invention a double thin foil may be used for encasing the rope heater prior to affixing it to the heat transfer plate. It is preferred that the heat transfer plate be substantially the same size as the area covered by the housing to provide maximum heat transfer to the aquarium tank through the wall 12. The actual per square inch wattage output of the heater can be varied by increasing or decreasing the plate size. It has been found that a 2 to 3 watt per square inch power heats efficiently without any concern for fire danger should the thermostat malfunction. The transfer plate being directly in contact with the aquarium wall permits the use of a heating element substantially smaller than the metal plate. This is a cost saving from a manufacturing standpoint.

FIG. 2 clearly depicts an insulation material in the form of a fiberglass or the like sheet 34 disposed between the outer wall of the housing and the heating element. This insulation limits heat loss and tends to confine heat transfer toward the wall of the aquarium tank.

The thermostat 32 is contained within the lower compartment 22B of the housing. It is noted that the bottom section of the heat transfer plate also extends at the rear of the compartment formed by this lower housing section. The indicator 24 (see FIG. 2) is disposed in this lower section and the lower wall 22D is provided with a passage for receiving the electrical cord 20 which may contain the typical two leads for 110 VAC operation. One of these leads may couple directly to the heating element 30 while the other lead couples by way of the bimetallic thermostat 32. The thermostat 32 is supported on a thermostat housing 48 which is preferably of plastic and received in the lower compartment 22B. The housing 48 supports a first contact 50 by means of a bolt 52 and a second contact 54 by means of a bolt 56. At least one of the contacts 50, 54 is a bimetallic contact. The thermostat is normally in a closed position coupling power to the heating element but when a sufficient temperature is sensed in the vicinity of the thermostat, basically in the sensing section of the housing, the contacts 50, 54 open to interrupt power temporarily to the heating element. The adjustment in spacing between the contacts 50 and 54 may be provided by the control knob 26 which couples to a lead screw 60 that may be used to position the lower contact 54 as depicted in FIG. 3.

In accordance with the present invention, the heater 10 is supported by the hanger 16. This hanger is depicted most clearly in FIGS. 2 and 4. The hanger comprises a top flange 64, an inner leg 66, and an outer depending leg 68. The leg 68 has a pair of spaced apertures 69 which interlock with a pair of lugs 70 extending from the outer surface of the plastic housing. The hanger 16 also includes a wall 72 which spaces the depending leg 68 outwardly, however, the hanger is arranged so that in a position of FIG. 2 with the stud 74 securing the hanger in place, the leg 68 provides a biasing force in the direction of arrow 75 so that, in addition to supporting the heater, the hanger forces the heater so that the heat transfer plate 28 is in a relatively intimate contact with the outer surface of wall 12 of the aquarium tank. The hanger 16 preferably extends so that it supports the heater at about its mid-point along its height. In this way it is assured that the contact is fairly consistent along the entire height of the heat transfer plate; that is the contact between the heat transfer plate and the wall of the tank.

With the heater supported on the side wall 12 of the tank as depicted in FIG. 1, and with the heat transfer plate in intimate contact with the glass side wall, with the power applied to the heater the thermostat normally is initially in its closed position. The thermostat within the sensing compartment of the heater is influenced by the temperature of the water within the tank due to thermal conductivity between the tank and heater and if the aquarium water is too cold, the thermostat closes thus activating the heating element. The metal plate 28 warms and true thermal conductivity heat is transferred through the wall 12 to the water within the aquarium tank. As the heat from the plate is conducted to the glass, it is rapidly absorbed by the water. When the water is sufficiently warmed, there is a reciprocal influence on the thermostat compartment and the thermostat eventually opens shutting off the heat to the heating element. The thermostat continues to operate in a cycling manner. That is, once the thermostat has opened heat within the sensing compartment will slowly decrease to a point where the thermostat again closes thus reactivating the heating element. The control knob 26 by varying the spacing of the contact 54 effectively lowers or increases the temperature attained in the tank. Drawing the contact 54 closer to the contact 50 requires an elevated temperature in order to separate the contacts and interrupt the thermostat.

FIG. 5 shows a slightly different version of the present invention. In FIG. 5 like reference characters are used to identify like parts in comparison to those used in FIGS. 1–4. Thus, in FIG. 5 there is shown the wall 12 of the aquarium tank having the heater positioned adjacent to an outer surface thereof. In FIG. 5 there is also shown the housing 22 which comprises an upper thinner section and a lower wider section as in the first embodiment. There is also provided a fiberglass sheet 34 which may be of the same type employed in the first embodiment. This fiberglass sheet may be either of rigid or non-rigid type. The heating element in this embodiment may be substantially the same as the heating element shown in the first embodiment. Also, the thermostat mechanism may be substantially the same in the second embodiment as previously shown in FIGS. 1–4. One of the key differences in the second embodiment is in the construction of the hanger 16A shown in FIG. 5. Another difference is in the construction of the heat transfer plate. In FIG. 5 there is actually shown two transfer plates 28A and 28B. Plate 28A is the plate having the heating element secured thereto. Both plates 28A and 28B are coplanar and both are meant to be held in intimate contact with the wall 12 of the tank. The plate 28A is basically covering the heating section of the housing while the plate 28B covers the sensing section of the housing. The plate 28B has a center section that is essentially directly in air contact with a portion of the bottom compartment 22B. The plate 28B is meant to cause heat conduction from the water, essentially sensing the temperature of the water and conveying this temperature into the compartment of housing section 22B.

The hanger 16A shown in FIG. 5, like the hanger shown in the first embodiment includes a top flange 64, depending leg 68, and interconnecting wall 72. The bottom of the leg 68 has a hooked end 80 accommodated by a recess 82 in the front wall of the housing. This arrangement of the hooked end with the recess provides an interlocking of the hanger with the heater. Furthremore, the leg 68 and wall 72 are arranged to provide the biasing force previously mentioned with regard to the first embodiment. The hanger is secured to the top edge of the wall 12 and in this regard the hanger is provided with an outwardly turned lip 84 that provides a force fit between the top end of the hanger and the top edge of the wall 12.

In the embodiment of FIGS. 6 and 7 the heater may be of substantially identical construction to the heater previously described in FIGS. 1–4. In this version of the invention the hanger is provided integral with the housing 22. In FIGS. 6 and 7 the heater is shown supported against the side wall 12 of the aquarium tank. The hanger 80 comprises a top flange 82, an inner leg 84, and an outer depending leg 86. The outer leg 86 has a reinforcing rib 88. At the very bottom of the outer leg 86 there is an integral connection with the top wall of the housing 22. Preferably, the entire hanger construction including legs 84 and 86 and top flange 82 is molded integrally with the housing. Alternatively, the hanger could be molded separately and integrally connected with the top wall of the housing 22. The hanger also includes a threaded stud 90 extending through leg 84 and contacting the inner surface of the aquarium tank wall 12. When the heater shown in FIGS. 6 and 7 is to be supported on the aquarium tank walls, the threaded stud 90 is rotated to open the gap between its end and the wall 86. In this position the bottom of the heater housing rests against the aquarium side wall. As the stud or screw 90 is turned, a biasing pressure is applied which presses the remaining portion of the heater plate against the aquarium glass. This final position is shown in FIG. 7.

One of the advantages of the present invention is that the heater is essentially automatically inhibited from operation when the device is removed from the aquarium tank. If the heater is removed even while power is coupled by way of line 20 to the heater, the heat sink effect created by the combination of the heater with the aquarium tank no longer exists and thus the temperature in the sensing chamber climbs quite rapidly opening the thermostat. This is a valuable safety feature in that if somebody such as a child should remove the heater, the heat coupled to the transfer plate will quite rapidly be interrupted.

What is claimed is:

1. In combination, an aquarium heater and a holder for the aquarium heater for mounting the heater against an outer surface of a side wall of an aquarium tank, said aquarium heater comprising an insulated housing, heat transfer plate means and means for selectively coupling electrically-generated heat to the heat transfer plate means from which the heat is coupled through the aquarium tank side wall to the water in the aquarium tank, said heater housing having a thickness less than its width and height and having an outer planar surface extending substantially in parallel with the aquarium tank side wall, said holder comprising an elongated member having a top flange for contacting a top edge of the tank side wall, top securing means connected to the top flange for securing on the inside of the side wall maintained the top end of the elongated member in a fixed position relative to the tank side wall, and a lower depending leg means extending from the top flange and at least partially outwardly of the tank side wall and housing outer planar surface, said lower depending leg means including top and bottom leg walls, said top leg wall coupled to said top flange and the top and bottom leg walls commonly interconnecting to form an angle therebetween less than 180°, said bottom leg wall having means for securing the depending leg means to the outer planar surface of the housing, said leg means arranged to provide a biasing force in a direction normal to the outer planar surface of the housing to maintain the heater heat transfer plate means in intimate contact with the outer surface of the side wall of the aquarium tank.

2. A holder as set forth in claim 1 wherein said means for locking includes an inner wall integral with the top flange and a locking member held by the inner wall.

3. A holder as set forth in claim 2 wherein said heater has a housing with at least one stud engageable with a hole in the bottom end of the depending leg.

4. A holder as set forth in claim 1 wherein said means for locking includes an inner lip integral with the top flange, said depending leg having a lower lip engageable in a recess in the heater.

5. The combination of claim 1 wherein the depending leg means is secured to the heater housing at about its midpoint along its height so as to assure heater contact consistently along the height of the heat transfer plate means.

6. The combination of claim 1 wherein the depending leg means assumes a position spaced from the tank side wall by the thickness of the housing and assumes a position closer to the tank side wall when the housing is absent.

7. The combination of claim 1 wherein the depending leg means also includes a vertical wall coupled directly from the top leg wall to the top flange.

8. The combination of claim 7 wherein the top leg wall is approximately 45° to the horizontal and the lower leg wall is out of the vertical slightly with its bottom closer to the tank than its top.

* * * * *